United States Patent [19]

Mori

[11] 4,203,653
[45] May 20, 1980

[54] INVERTED TELEPHOTO TYPE WIDE ANGLE LENS SYSTEM

[75] Inventor: Ikuo Mori, Kawasaki, Japan

[73] Assignee: Nippon Kogaku K.K., Tokyo, Japan

[21] Appl. No.: 918,592

[22] Filed: Jun. 23, 1978

[30] Foreign Application Priority Data

Jun. 29, 1977 [JP] Japan ................................ 52-77329

[51] Int. Cl.² ................................................. G02B 9/60
[52] U.S. Cl. .................................................... 350/216
[58] Field of Search ................................ 350/216, 176

[56] References Cited
U.S. PATENT DOCUMENTS 3,936,153  2/1976  Ogura ................................. 350/216

FOREIGN PATENT DOCUMENTS 931063  7/1963  United Kingdom ..................... 350/216

*Primary Examiner*—Paul A. Sacher
*Attorney, Agent, or Firm*—Shapiro and Shapiro

[57] ABSTRACT

An inverted telephoto type wide angle lens system comprises, in order from the object side, a negative meniscus lens having its convex surface facing the object side, a first positive lens, a negative lens, a second positive lens and a third positive lens. The lens system satisfies certain conditions.

5 Claims, 4 Drawing Figures

PRINCIPAL RAYS OF 37°

PRINCIPAL RAYS OF 37°

SPHERICAL ABERRATION ΔS
SINE CONDITION SC

ASTIGMATISM

DISTORTION

INVERTED TELEPHOTO TYPE WIDE ANGLE LENS SYSTEM

BACKGROUND OF THE INVENTION

1. Field of the Invention

This invention relates to improvements in inverted telephoto type wide angle lens systems.

2. Description of the Prior Art

Generally, inverted telephoto lenses are advantageous as wide angle lenses for single lens reflex cameras, but distortion becomes more pronounced as the short focal length lens has a greater angle of view. To correct this, it has usually been the practice to incorporate in the divergent group a member having a positive refractive power, but this has increased the size of the entire lens system and increased the number of lens components as well as the weight of the lens system. This is inconvenient to the portability of the lens system and very disadvantageous in production.

SUMMARY OF THE INVENTION

It is an object of the present invention to provide an inverted telephoto type wide angle lens system of simple construction which is very small in size and yet has a relative aperture of 1:2.8, an angle of view of 74° and a back focus 1.29 times or greater than the focal length of the lens system.

The above object and other features of the present invention will become more fully apparent from the following description of embodiments of the invention.

DESCRIPTION OF THE PREFERRED EMBODIMENTS

Figure 1:
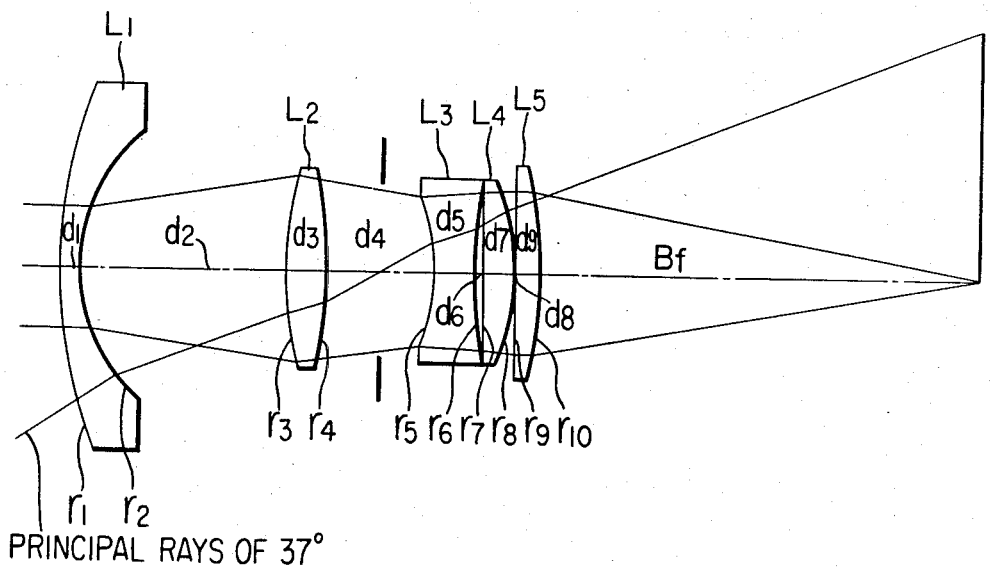
FIG. 1 is a cross-sectional view of the lens system according to the present invention.

As shown in FIG. 1, the inverted telephoto type wide angle lens system according to the present invention comprises five components which are, in order from the object side, a negative meniscus lens L1 having its convex surface facing the object side, a biconvex positive lens L2, a negative lens L3, and two positive lenses L4 and L5 which are also meniscus lenses. The lens system satisfies the following conditions:

$$0.25f < d_4 < 0.5f \quad (1)$$

$$1.6d_4 < d_2 < 2.5d_4 \quad (2)$$

$$d_3 < 0.5d_4 \quad (3)$$

where $d_4$ is the air space between the positive lens L2 and the negative lens L3, $d_2$ is the air space between the negative meniscus lens L1 and the positive lens L2, $d_3$ is the center thickness of the positive lens $L_2$, and f is the total focal length of the entire system.

Forming a divergent group by a simple negative meniscus lens as in the present invention is highly effective to reduce the size and weight of the lens system and to reduce the number of the lenses used. On the other hand, because it is a short focal length lens, such lens system creates pronounced negative distortion as the result of its strong diverging action. To correct this, a member having a positive refractive power has been added as part of the divergent group or the divergent group has been formed by two negative lenses, as is well-known in the art. According to the present invention, free from such conventional techniques, there has been found the possibility of providing a sufficiently good aberration balance by a novel technical means. More specifically, in the lens construction of the present invention, the only convergent air space $d_4$ which affects the distortion is large, as seen in condition (1) above.

Such means is based on the design concept that employs the positive lens L2 as a kind of distortion correcting lens, and it leads to a very useful effect in that it eliminates the need to use a combination of more than one lens as heretofore known, such as for example, the need to provide a positive member in the divergent group. However, the large convergent air space $d_4$ results in overcorrection of the astigmatism, but this can be overcome by a means which will hereinafter be described.

Each of the individual conditions will be described in detail. If the upper limit of condition (1) above is exceeded, the distortion may be further corrected, but a large overcorrection of the astigmatism will result. On the other hand, if the lower limit of condition (1) is exceeded, negative distortion will be increased and it becomes impossible to form the divergent group by a single negative lens. Condition (2) is intended to maintain the correction of the distortion while securing a predetermined back focus as the lens for single lens reflex camera. If the upper limit of this condition is exceeded, the negative distortion will be increased due to the property of the divergent space and at the same time, the size of the entire lens system will become bulky, contrary to an object of the present invention. If the lower limit of condition (2) is departed from, the back focus will be shortened and make the lens system unusable as the lens for a single lens reflex camera. Condition (3) prevents the aforementioned overcorrection of the astigmatism which may result from condition (1), and if condition (3) is exceeded, no good correction may be obtained.

By the described construction of the present invention, a simple inverted telephoto type wide angle lens has been realized which has a relative aperture of 1:2.8, an angle of view of 74° and a back focus 1.29 times or greater than the total focal length of the entire system and yet is very small in overall size and comprises only five lens components.

Further, in the conventional wide angle lens of this type, the center thickness of the positive lens just before the diaphragm, has tended to be considerably large, and it has been difficult to make the positive lens as a single lens. For example, the positive lens have been formed of two planoconvex lenses, but in the lens system of the present invention, the center thickness $d_3$ of the positive lens L2 can be made quite small as a result of condition (3) described above. This leads to greater ease with which such positive lens is produced, which in turn leads to a reduced size of the entire lens system and a further reduction in the cost.

In the present invention, some desirable conditions as follows may be indicated in addition to the above-described characteristic conditions. To provide a sufficient back focus, the following conditions may be adopted: for the focal length $f_1$ of the negative meniscus lens L1;

$$f < |f_1| < 2f \quad (4)$$

and for the focal length $f_2$ of the positive lens $L_2$ which contributes to the correction of the distortion;

$$0.8f < f_2 < 1.1f \quad (5)$$

where f is the total focal length of the entire system.

To provide good correction of the sine condition, the following condition may be adopted:

$$r_3 < |r_4|$$

where $r_3$ is the curvature radius of the object side surface of the positive lens L2 and $r_4$ the curvature radius of the image side surface of the same lens.

Further, to provide good correction of the sagittal image plane, the air space $d_6$ between the negative lens L3 and the positive lens L4 should desirably be made smaller than ½ of the center thickness of any of the negative lens L3 and the two positive lens L4 and L5. To provide much better correction of the distortion, the two positive lenses L4 and L5 should desirably be formed with their more curved surfaces facing the image side.

Figure 2A:
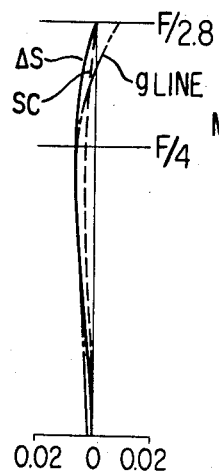
FIGS. 2A–2C graphically illustrate the aberrations in a first embodiment of the present invention.
Figure 2B:
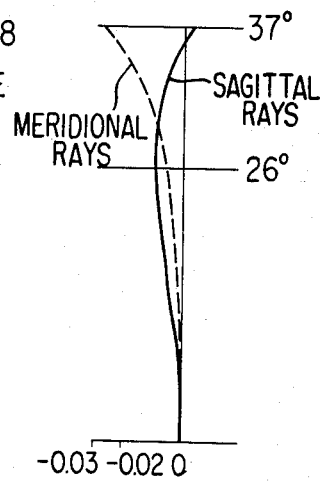
Figure 2C:
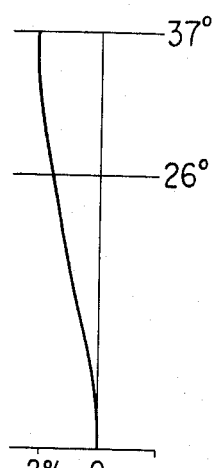

FIGS. 2A-2C show the aberrations in a first embodiment of the inverted telephoto type wide angle lens according to the present invention. Various numerical data of two embodiments of the present invention are shown below. In these embodiments, $r_1, r_2, \ldots, r_{10}$ are the curvature radii of the successive lenses from the object side, $d_1, d_2, \ldots, d_9$ are the center thicknesses of and the air spaces between the individual lenses, $n_1, n_2, \ldots, n_5$ and $\nu_1, \nu_2, \ldots, \nu_5$ are the refractive indices and Abbe numbers, respectively, of the various lenses.

First Embodiment:
Total focal length f=1.0
Relative aperture 1:2.8
Angle of view 74°

| | | | |
|---|---|---|---|
| $r_1 = 1.266$ | $d_1 = 0.07$ | $n_1 = 1.67025$ | $\nu_1 = 57.5$ |
| $r_2 = 0.525$ | $d_2 = 0.576$ | | |
| $r_3 = 0.825$ | $d_3 = 0.094$ | $n_2 = 1.60323$ | $\nu_2 = 42.5$ |
| $r_4 = -1.696$ | $d_4 = 0.301$ | | |
| $r_5 = 0.563$ | $d_5 = 0.112$ | $n_3 = 1.7847$ | $\nu_3 = 26.1$ |
| $r_6 = 2.273$ | $d_6 = 0.026$ | | |
| $r_7 = -2.098$ | $d_7 = 0.073$ | $n_4 = 1.80411$ | $\nu_4 = 46.6$ |
| $r_8 = -0.647$ | $d_8 = 0.004$ | | |
| $r_9 = -17.482$ | $d_9 = 0.087$ | $n_5 = 1.732$ | $\nu_5 = 51.0$ |
| $r_{10} = -0.839$ | | | |

Back focus B.f.=1.295

The numerical data for the second embodiment of the invention (not illustrated) is as follows:
Total focal length f=1.0
Relative aperture 1:2.8
Angle of view 74°

| | | | |
|---|---|---|---|
| $r_1 = 1.419$ | $d_1 = 0.057$ | $n_1 = 1.6228$ | $\nu_1 = 56.9$ |
| $r_2 = 0.501$ | $d_2 = 0.623$ | | |
| $r_3 = 0.901$ | $d_3 = 0.118$ | $n_2 = 1.62374$ | $\nu_2 = 47.0$ |
| $r_4 = -1.459$ | $d_4 = 0.327$ | | |
| $r_5 = -0.588$ | $d_5 = 0.122$ | $n_3 = 1.7552$ | $\nu_3 = 27.5$ |
| $r_6 = 1.899$ | $d_6 = 0.021$ | | |
| $r_7 = -6.261$ | $d_7 = 0.087$ | $n_4 = 1.713$ | $\nu_4 = 53.9$ |
| $r_8 = -0.633$ | $d_8 = 0.004$ | | |
| $r_9 = -9.913$ | $d_9 = 0.073$ | $n_5 = 1.77279$ | $\nu_5 = 49.4$ |
| $r_{10} = -1.110$ | | | |

Back focus B.f.=1.309

It is believed that the advantages and improved results of inverted telephoto type wide angle lens system of the invention will be apparent from the foregoing description of several preferred embodiments thereof. Various modifications may be made without departing from the spirit and scope of the invention as sought to be defined in the following claims.

I claim:

1. An inverted telephoto type wide angle lens system comprising, in order from the object side, a negative meniscus lens having its convex surface facing the object side, a first positive lens, a negative lens, a second positive lens and a third positive lens, said lens system satisfying the following conditions:

$$0.25f < d_4 < 0.5f$$

$$1.6d_4 < d_2 < 2.5d_4$$

$$d_3 < 0.5d_4,$$

where $d_2$ is the air space between the negative meniscus lens and the first positive lens, $d_3$ is the center thickness of the first positive lens, $d_4$ is the air space between the first positive lens and the negative lens, and f is the total focal length of the entire system.

2. A lens system according to claim 1, wherein said first positive lens is a biconvex lens having its more curved surface facing the object side, said lens system further satisfying the following conditions:

$$f < |f_1| < 2f$$

$$0.8f < f_2 < 1.1f$$

where $f_1$ and $f_2$ are the focal lengths, respectively, of the negative meniscus lens and the first positive lens.

3. A lens system according to claim 2, wherein the air space between the negative lens and said second positive lens is smaller than ½ of the center thickness of any of said second positive lens and said third positive lens, and said second positive lens and said third positive lens are positive meniscus lenses having their convex surfaces facing the image side.

4. A lens system according to claim 3, and further having the following numerical data:
Total focal length f=1.0
Relative aperture 1:2.8
Angle of view 74°
Back focus B.f.=1.295

| | | | |
|---|---|---|---|
| $r_1 = 1.266$ | $d_1 = 0.07$ | $n_1 = 1.67025$ | $\nu_1 = 57.5$ |
| $r_2 = 0.525$ | $d_2 = 0.576$ | | |
| $r_3 = 0.825$ | $d_3 = 0.094$ | $n_2 = 1.60323$ | $\nu_2 = 42.5$ |
| $r_4 = -1.696$ | $d_4 = 0.301$ | | |
| $r_5 = -0.563$ | $d_5 = 0.112$ | $n_3 = 1.7847$ | $\nu_3 = 26.1$ |
| $r_6 = 2.273$ | $d_6 = 0.026$ | | |
| $r_7 = -2.098$ | $d_7 = 0.073$ | $n_4 = 1.80411$ | $\nu_4 = 46.6$ |
| $r_8 = -0.647$ | $d_8 = 0.004$ | | |
| $r_9 = -17.482$ | $d_9 = 0.087$ | $n_5 = 1.732$ | $\nu_5 = 51.0$ |
| $r_{10} = -0.839$ | | | | where $r_1, r_2, \ldots, r_{10}$ are the curvature radii of the successive lenses from the object side, $d_1, d_2, \ldots, d_9$ are the center thicknesses of and the air spaces between the individual lenses, $n_1, n_2, \ldots, n_5$ and $\nu_1, \nu_2, \ldots, \nu_5$ are the refractive indices and Abbe numbers, respectively, of the various lenses.

5. A lens system as defined in claim 3, and further having the following numerical data:

Total focal length f=1.0
Relative aperture 1:2.8
Angle of view 74°
Back focus B.f=1.309

| | | | |
|---|---|---|---|
| $r_1 = 1.419$ | $d_1 = 0.057$ | $n_1 = 1.6228$ | $\nu_1 = 56.9$ |
| $r_2 = 0.501$ | $d_2 = 0.623$ | | |
| $r_3 = 0.901$ | $d_3 = 0.118$ | $n_2 = 1.62374$ | $\nu_2 = 47.0$ |
| $r_4 = -1.459$ | $d_4 = 0.327$ | | |
| $r_5 = -0.588$ | $d_5 = 0.122$ | $n_3 = 1.7552$ | $\nu_3 = 27.5$ |

-continued

| | | | |
|---|---|---|---|
| $r_6 = 1.899$ | $d_6 = 0.021$ | | |
| $r_7 = -6.261$ | $d_7 = 0.087$ | $n_4 = 1.713$ | $\nu_4 = 53.9$ |
| $r_8 = -0.633$ | $d_8 = 0.004$ | | |
| $r_9 = -9.913$ | $d_9 = 0.073$ | $n_5 = 1.77279$ | $\nu_5 = 49.4$ |
| $r_{10} = -1.110$ | | | | where $r_1, r_2, \ldots, r_{10}$ are the curvature radii of the successive lenses from the object side, $d_1, d_2, \ldots, d_9$ are the center thicknesses of and the air spaces between the individual lenses, $n_1, n_2, \ldots, n_5$ and $\nu_1, \nu_2, \ldots, \nu_5$ are the refractive indices and Abbe numbers, respectively, of the various lenses.

* * * * *